May 11, 1948.　　　　P. PEVNEY　　　　2,441,206
FLUID-TIGHT SEAL FOR RIGID MEMBERS
Filed Nov. 24, 1943　　　2 Sheets-Sheet 1
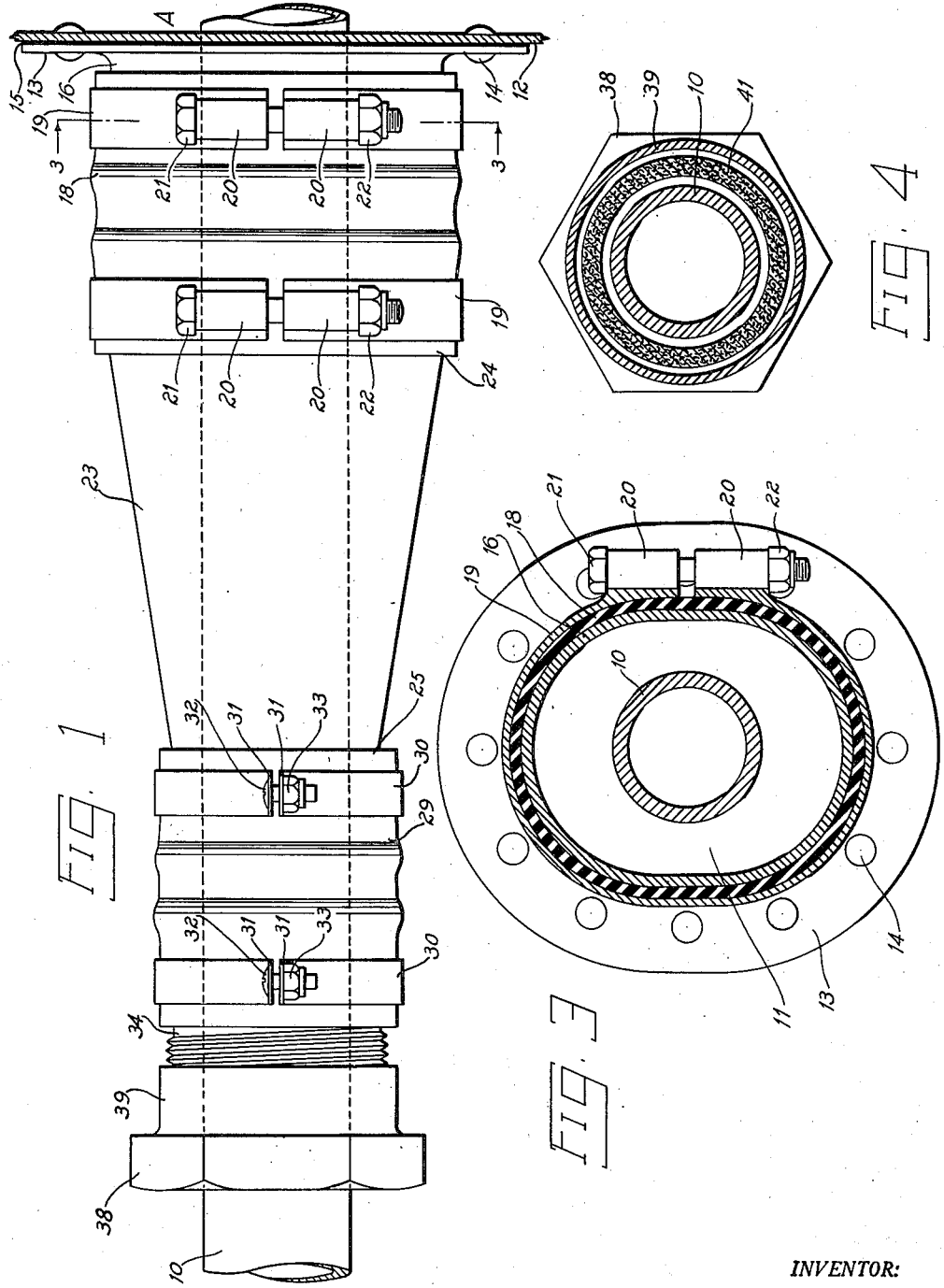
INVENTOR:
PAUL PEVNEY;
BY:
R C Rasche
ATTORNEY.

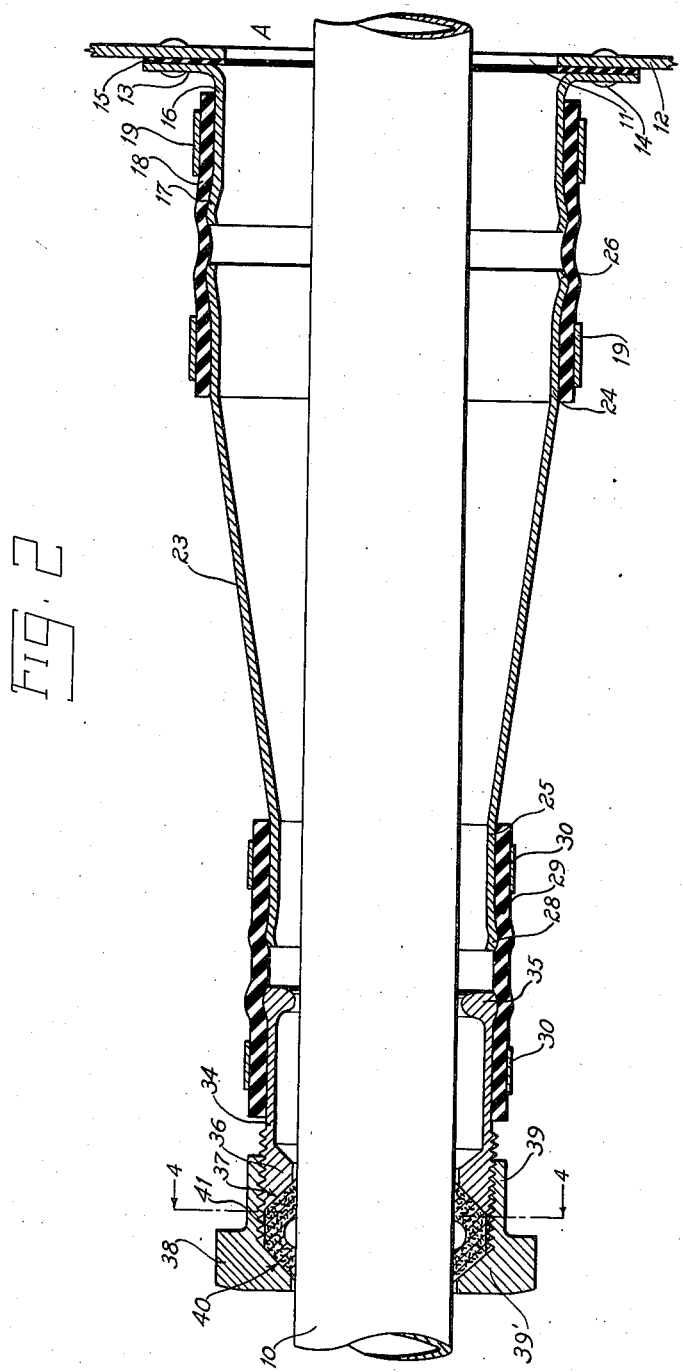

Patented May 11, 1948

2,441,206

UNITED STATES PATENT OFFICE 2,441,206

FLUID-TIGHT SEAL FOR RIGID MEMBERS

Paul Pevney, Massapequa, N. Y., assignor to Republic Aviation Corporation, a corporation of Delaware Application November 24, 1943, Serial No. 511,543

7 Claims. (Cl. 286—15)

This invention relates to seals for the prevention of air or fluid leakage between a stationary and a coacting movable part where the movable part reciprocates through the stationary part and in reciprocating swings through an arc.

While the instant invention is capable of use with any enclosure through the walls of which a movable part reciprocates and bodily swings or oscillates, it is particularly designed for use in conjunction with the controls of high altitude aircraft in which an internal cabin pressure is maintained at the atmospheric pressure of a predetermined altitude, such for example as the atmospheric pressure at 10,000 feet. In being so used the present device seals the aperture in the wall or partition defining the cabin through which an airfoil control passes so that the predetermined pressure within the cabin may be maintained and preserved.

The controls of the various airfoils of an aircraft usually consist of either push-pull rods which are rigid, or cables which are flexible, and these controls for the airfoils in many instances pass through openings in the walls or partitions defining the cabin of the aircraft. The present invention is primarily designed to cooperate with a rigid type of airfoil control, such as a push-pull rod, to seal the opening through which it passes in leaving the cabin and thus prevent any leakage of the interior pressure of the cabin through such opening, at the same time permitting the normal and necessary movements of the rod or other airfoil control member.

With the above and other objects in view, as will be apparent, the invention consists in the construction, combination and arrangement of parts, all as hereinafter more fully described, claimed and illustrated in the accompanying drawings, wherein:

Fig. 1 is an elevation of the present seal, with the wall or bulkhead defining an aircraft cabin or other enclosure being fragmentarily shown in section;

Fig. 2 is a central longitudinal section of the sealing assembly;

Fig. 3 is a transverse section through the seal assembly, being taken along line 3—3 of Fig. 1; and Fig. 4 is a similar section taken along line 4—4 of Fig. 2.

Reference being had more particularly to the drawings, 10 designates a push-pull rod for the control of an airfoil of an aircraft which reciprocates through the opening 11 in one of the walls 12 defining the cabin A of an aircraft. The pressure on the interior of the cabin A at high altitudes exceeds the pressure on the exterior thereof and it is the function of the present invention to prevent and overcome any leakage of that higher pressure through the opening 11 to the exterior atmosphere. For that purpose a bracket plate 13 is secured to the exterior face of the wall 12 by the rivets 14 which pierce the plate and the wall to compress a rubber gasket 15 positioned between them. An outstanding stub tube 16 is formed integrally with the plate 13 and therefore circumscribes the opening 11. The outer extremity of this tube 16 is provided with a convolution 17, the utility of which will be hereinafter apparent.

From Fig. 3 it will be observed that the opening 11 within the wall 12 is substantially the same shape and size as the section of the stub tube 16, viz, elongated or generally oval. This permits the push-pull rod 10 to swing or oscillate as well as reciprocate through and in the stub tube 16.

A flexible, resilient collar 18 at one of its ends surrounds and closely embraces the stub tube 16 and is held in such position by a clamping band 19 which encircles the terminal portion of the collar 18. This band 19 comprises a strip of metal encircling the end portion of the collar 18 to grip and clamp it against the stub tube 16. At its ends this band 19 is provided with the bushings 20 which align when the band is in its operative position to permit the passage of the bolt 21 through both bushings, the head of the bolt bearing against the outer extremity of one of the bushings 20 while the nut 22 operates against the outer extremity of the opposed bushing 20. As the nut 22 is adjusted on the bolt 21, the bushings 20 are correspondingly adjusted by being moved toward or away from each other, thereby tightening or loosening the grip of the band 19 upon the collar 18 and of the collar 18 on the stub tube 16.

Encircling the rod 10 is a tapering tube 23 having its larger end portion 24 adjacent to and substantially of the same cross sectional contour as that of the stub tube 16 and its opposite end portion 25 substantially cylindrical and only slightly larger in diameter than the rod 10, the end portions 24 and 25 being untapered.

The extremity of the end portion 24 of the tube 23 is provided with an external convolution 26 and approximately the entire end portion 24 is received within the outer extremity of the collar 18 which is held in gripping contact with said end portion 24 by another clamping band 19.

It will be observed from Fig. 2 that the adjoining extremities of the stub tube 16 and the inner or larger end portion 24 of the tube 23 are spaced one from the other and are connected by the flexible elastic collar 18, the latter being the only closure for this space between the adjoining extremities of these tubes. Since the stub tube 16 is immovably anchored to the outer face of the wall 12, the tube 23 must and may move relatively to the tube 16 and to the wall or partition, the flexible, elastic nature of the collar 18 permitting this movement while maintaining the space between the adjoining ends of these tubes effectively sealed against the passage of fluid. The external convolutions 17 and 26 formed in the adjacent ends of the tubes 16 and 23, become embedded in the collar 18 and are there held by the clamping bands 19 to create an intimate fluid-tight engagement between the tubes and the collar which is auxiliary and supplemental to the seal created by elastic engagement by the collar 18 of the tubes 16 and 23.

At its outer terminal extremity the cylindrical end portion 25 of the tapered tube 23, is also provided with a convolution 28 which is surrounded and engaged by a second flexible, elastic collar 29. This collar 29 is secured to the end portion 25 of the tube 23 by the anchoring or clamping band 30 which encircles the collar and the terminal portion 25 of the tube. This band may be a duplicate of the bands 19 or may be provided with outstanding ears 31 at its ends through which a bolt 32 passes for adjustable engagement by the nut 33. As in the case of clamping bands 19, the bolt 32 and nut 33 not only secure the collar 29 in place but regulate the pressure of the band 30 upon the collar 29 and insure the sealing engagement between the terminal portion 25 of the tube 23 and said collar.

The outer extremity of the collar 29 receives and embraces a tubular bushing 34 which is provided, where engaged by the collar 29, with a bead 35 extending upon both sides of its extremity to be embedded in the collar 29 exteriorly of the bushing and interiorly of the bushing form a guide for the push-pull rod 10. A second band 30 encircles the collar 29 and the bushing 34 to secure these elements together in the same manner as the opposite end of the collar 29 and the end portion 25 of the tube 23 are secured together.

It will be noted that the passage through the bushing 34 and the terminal cylindrical end portion 25 of the tube 23 are of substantially the same diameter and are coextensive, and that these passages are somewhat greater in diameter than the diameter of the rod 10 which passes through them. This permits the rod to reciprocate freely within these elements and yet have no appreciable swinging or oscillating play or movement therein. The internal portion of the bead 35 somewhat reduces the diameter of the passage in the bushing 34 at one of its ends and combines with an internal bearing 36 at the outer extremity of the bushing 34, defining an opening for the passage of the rod 10 of about the same diameter as the opening defined by the bead 35, to guide and center the rod 10 within the bushing so that there will be no binding action to impede the reciprocation of the rod. As the rod 10 swings or oscillates during its reciprocation in the bushing 34 the latter moves with it, always maintaining its axis coincident with that of the rod.

The sides of the bearing 36 converge inwardly of the bushing 34 thereby creating an inwardly sloping seat 37 at the outer extremity of the bushing. A sleeve 39 encircles and is threaded upon the outer extremity of the bushing 34 and is provided with an inwardly extending lip 39' through which the rod 10 passes and reciprocates. This lip 39' has an outwardly sloping inner face or seat 40 that coacts with the seat 37 in the extremity of the bushing 34 for the mounting and engagement of a sealing member 41. The lip 39' defines an opening through which the rod 10 passes that is of approximately the same diameter as the openings in the bearing 36 and bead 35, thereby providing three elements in the entire assembly that guide and center the rod 10 to prevent any binding between it and the sleeve 39 and the bushing 34.

The sealing member 41 engaged between the seats 37 and 40 constitutes a ring having a central, interior concavity which creates two arms at the sides of the ring to embrace the rod 10 in intimate sealing but non-adhering contact. This sealing member may be made of any material suitable for the conditions under which it must operate and is here shown as felt. A faced ridge or projecting flange 38 is provided on the sleeve 39 for its engagement and adjustment. By adjusting the position of the sleeve 39 the sealing member may be compressed or relieved.

As the rod 10 reciprocates through the opening 11 it also reciprocates through the stub tube 16, the tapering tube 23, its end portions 24 and 25, the bushing 34, the bearing 36, the bead 35 of the bushing, and the lip 39' of the sleeve 39. Its movement through these elements is unimpeded but the escape of pressure from within the cabin A through the aforesaid elements is effectively stopped by the sealing contact between the sides and edges of the sealing member 41 and the rod, and by the flexible elastic collars 18 and 29. Since this rod 10 not only reciprocates but swings or oscillates with its greatest swing or oscillation within the cabin A, the tapered tube 23 with its generally oval end portion 24 and the generally oval stub tube 16 permits this oscillation without impeding it. Since the bushing 34 and the sleeve 39 are in effect secured to the rod 10 for swinging movement with it, and as the outer extremity of the tube 23 has a similar tendency, the flexible connections provided by the collars 18 and 29 between the bushing 34 and the end portion 25 of the tube 23 and between the end portion 24 of the tube 23 and the stub tube 26 makes it possible for the outer extremity of the present sealing structure or assembly to oscillate or swing in unison with the rod 10 while maintaining the passage through the assembly effectively aligned and fluid tight.

While the present invention has been described as being particularly designed for use in connection with the pressurized cabin of an aircraft and for especial use in conjunction with a rigid airfoil control member, this is manifestly merely one of its manifold uses for it obviously can be employed to advantage wherever either rigid or flexible members operate through the wall of any enclosure which is isolated or insulated from the surrounding atmosphere for any purpose. An example of such use would be an air-conditioned or temperature controlled enclosure through the walls of which members reciprocate, the present device being used to seal the openings through which said members pass.

What is claimed:

1. The combination with a rod mounted for reciprocation and swinging movement, of a stub tube surrounding said rod and defining a passage elongated in section, a circular bushing spaced from said stub tube and surrounding said rod, a sealing member interposed between said bushing and said rod, a conical intermediate tube disposed between said bushing and said stub tube having its large or base end elongated to correspond to the cross sectional shape of the stub tube and its smaller end cylindrical to form a substantial continuation of said bushing, an elastic sleeve embracing the stub tube and the large end of said intermediate tube and removably and sealingly secured to each, and a second elastic sleeve surrounding the bushing and the cylindrical end of the intermediate tube and removably and sealingly secured to each.

2. The combination with a rod mounted for reciprocation and swinging movement, of an approximately oval stub tube surrounding said rod, a circular bushing spaced from said stub tube and surrounding said rod, a sealing member interposed between said bushing and said rod, a conical intermediate tube disposed between said bushing and said stub tube having its large or base end corresponding in cross-section to the cross-sectional shape of the stub tube and its smaller end cylindrical to form a substantial continuation of said bushing, an elastic sleeve embracing the stub tube and the large end of said intermediate tube and sealingly engaging each, a second elastic sleeve surrounding the bushing and the cylindrical end of the intermediate tube and sealingly engaging each, and multiple bearings within said bushing to maintain the longitudinal axis of the bushing substantially coincident with the longitudinal axis of the rod at all times.

3. The combination with the wall of an enclosure having an opening therein, of a rod mounted for reciprocation and orbital movement through said opening, a stub tube circumscribing said opening and surrounding said rod, a bushing remote from said stub tube and encircling said rod, spaced bearings within said bushing and operating on said rod to maintain the longitudinal axis of the bushing substantially coincident with the longitudinal axis of the rod, a seal interposed between said bushing and said rod, a tapering tube interposed between said stub tube and said bushing with its smaller end coextensive with the bushing and its larger end coextensive with the stub tube, and flexible sleeves embracing the ends of said tapering tube and the adjoining ends of the bushing and of the stub tube.

4. In an aircraft, the combination with the wall of a sealed pressure compartment having an opening of relatively large section provided therein and a rigid control member passing therethrough for angular and reciprocatory movement, of an air-tight seal to prevent the air under pressure within the compartment from escaping through the opening comprising: a tubular rigid member of relatively large section secured to the wall around the opening; a stuffing-box of relatively small circular section mounted on the control member at a substantial distance from said tubular member; a tubular housing having a head of relatively large section adjacent said tubular member, a substantially cylindrical head, of relatively small section adjacent said stuffing-box and a tapering intermediate portion joining these two heads; and flexible air-tight connections between the heads of said housing and respectively said stuffing-box and said tubular member.

5. In an aircraft, the combination with the wall of a sealed pressure compartment having an opening provided therein and a push-pull control rod passing therethrough for angular and reciprocating movement, of an air-tight seal to prevent the air under pressure within the compartment from escaping through the opening comprising: a flanged stub tube of elongated section; an airtight rigid connection between the flange of said stub tube and the wall around the opening; a hollow rigid housing surrounding the rod and having a large open end of corresponding elongated section aligned with and slightly spaced from said stub tube and a smaller cylindrical end, a flexible sleeve of corresponding elongated section adjustably clamped to said stub tube and to the large end of said housing to bridge the gap and form an air-tight, flexible joint therebetween; a stuffing-box of substantially circular section mounted on the rod in alignment with and slightly spaced from the smaller end of said housing; and a cylindrical sleeve of flexible material adjustably clamped to said stuffing-box and to the smaller end of said housing to bridge the gap and form an air-tight, flexible joint between the stuffing-box and housing.

6. In an aircraft, the combination with the wall of a sealed pressurized cockpit said wall having a substantially oval opening and a rigid control rod operating through said opening for angular and reciprocating movement, of an air-tight seal coacting with said rod and said opening to prevent the air under pressure within the cockpit from escaping through said opening comprising: a flange circumscribing said opening, a flexible collar sealingly encircling said flange and fixed thereto, a tube having its inner end portion formed to constitute a continuation of said flange and fixedly and sealingly engaged within the outer extremity of said flexible collar and having a reduced and substantially cylindrical outer end portion, the body of the tube tapering from its inner to its outer end portion, a cylindrical flexible collar encircling and sealingly engaging the outer end portion of said tube, a bushing fixedly and sealingly engaged in part within said cylindrical collar to align with the outer extremity of the tube, the outer end of said bushing being exteriorly threaded and provided with an interior, inwardly sloping seat, a sleeve threaded on the end of said bushing having an interior outwardly sloping seat, and a sealing member, U-shaped in cross-section, positioned between said seats with the edges of its sides snugly and sealingly contacting the aforesaid rod.

7. In an aircraft, the combination with the wall of a sealed pressurized cockpit said wall having a substantially oval opening and a rigid control rod operating through said opening for angular and reciprocating movement, of an air-tight seal coacting with said rod and said opening to prevent the air under pressure within the cockpit from escaping through said opening comprising: a stub tube circumscribing said opening having an outstanding flange flush against the wall surrounding the opening, a sealing gasket interposed between said flange and said wall, a flexible collar sealingly encircling said stub tube and fixed thereto, an intermediate tube having its inner end portion oval and spaced from said stub tube but in alignment therewith, said inner end portion being fixedly and sealingly engaged within the outer extremity of said flexible collar, a reduced and substantially cylindrical outer end portion on said tube, the body of the tube tapering from its inner end portion to its outer end portion, a substantially cylindrical flexible collar encircling and sealingly engaging the outer end portion of said tube, a bushing fixedly and sealingly engaged by the outer end portion of said cylindrical collar to align with the outer extremity of the tube, the exposed outer end portion of said bushing being exteriorly threaded and provided with an interior inwardly sloping seat, a sleeve threaded on said bushing having an interior outwardly sloping seat, a sealing member, U-shaped in cross section, positioned between said seats with the edges of its sides snugly and sealingly contacting the aforesaid rod, and a pair of inwardly projecting bearings within said bushing and a similar aligned bearing on said sleeve the bores of which align and approximately encircle said rod.

PAUL PEVNEY.

REFERENCES CITED

The following references are of record in the file of this patent:

UNITED STATES PATENTS

| Number | Name | Date |
|---|---|---|
| 658,207 | Conroy | Sept. 18, 1900 |
| 1,529,874 | Culbertson | Mar. 17, 1925 |
| 1,644,775 | Fulton | Oct. 11, 1927 |
| 1,902,360 | Foster | Mar. 21, 1933 |
| 1,928,122 | Bennett | Sept. 26, 1933 |

FOREIGN PATENTS

| Number | Country | Date |
|---|---|---|
| 739,996 | France | 1932 |